United States Patent [19]

Landmeier

[11] Patent Number: 4,734,546
[45] Date of Patent: Mar. 29, 1988

[54] DIGITIZER SYSTEM WITH LOOPBACK CONDUCTOR GRID

[75] Inventor: Waldo L. Landmeier, Scottsdale, Ariz.

[73] Assignee: CalComp, Inc., Anaheim, Calif.

[21] Appl. No.: 26,217

[22] Filed: Mar. 16, 1987

[51] Int. Cl.⁴ .............................................. G08C 21/00
[52] U.S. Cl. ...................................................... 178/19
[58] Field of Search .................... 178/18, 19; 324/207, 324/208; 364/520; 382/13

[56] References Cited

U.S. PATENT DOCUMENTS

| | | | |
|---|---|---|---|
| 3,819,857 | 6/1974 | Inokuchi | 178/19 |
| 4,029,899 | 6/1977 | Gordon | 178/19 |
| 4,418,242 | 11/1983 | Kouno | 178/19 |
| 4,423,286 | 12/1983 | Bergeron | 178/19 |
| 4,471,162 | 9/1984 | Aono et al. | 178/19 |
| 4,560,830 | 12/1984 | Perl | 178/19 |
| 4,570,033 | 2/1986 | Hulls | 178/19 |
| 4,661,656 | 4/1987 | Rodgers et al. | 178/18 |

Primary Examiner—Stafford D. Schreyer
Attorney, Agent, or Firm—Cesari and McKenna

[57] ABSTRACT

In a digitizer system, adjacent conductors in pairs are looped through four quarter sections of a grid active area in such a way that the unexcited polarities of the pair are different in each quarter section. A coil in a pen tip is moveable relative to the grid, and used to inductively couple signals in the conductors of the grid. The number of conductors required to span a given grid active area, and the number of multiplexers required to handle such conductors, are reduced by a factor of four. The polarities of signals induced in the conductors by the coil are selectively changed depending upon the quarter section in which the coil is located and sampled to coarsely locate the coil as being between two particular adjacent conductors. In the disclosed embodiment, a ratio of the magnitudes of the signals induced in the two particular conductors is then used to precisely locate the coil between these two adjacent conductors.

27 Claims, 4 Drawing Figures

DIGITIZER SYSTEM WITH LOOPBACK CONDUCTOR GRID

BACKGROUND OF THE INVENTION

This invention relates to a method and apparatus for determining the position of a coil relative to a grid of spaced conductors, such as those involved in so-called pen digitizer systems, and more particularly, digitizer systems which achieve high resolution with substantial reductions in components and cost.

Various high resolution digitizer systems, which translate a position of a movable instrument, such as a pointer or pen, into electrical signals for transmission to a local or remote utilization device, are well known in the art.

U.S. Pat. No. 4,210,775 to James L. Rodgers et al discloses a digitizer system in which a pen having a coil disposed within its tip is utilized in conjunction with a support surface having an active area defined by a grid of conductors. The grid includes a group of parallel spaced conductors oriented in an X direction and a group of parallel spaced conductors oriented in a Y direction. An oscillator applies an AC signal of predetermined frequency and amplitude to the coil. The coil signal is inductively coupled to the conductors of the grid, thereby inducing AC electrical signals in the conductors.

In accordance with the well known principles of electromagnetic theory, the magnitude and phase of the signals induced in the grid conductors depend on the location of the conductors relative to the coil. Generally, the signals induced in the conductors will have a greater magnitude the closer the windings of the coil are to such conductors, while the phase of the signals on one side of the coil will be the reverse of (80° displaced from) the phase of the signals on the other side of the coil. The grid conductors in each group are scanned sequentially through the use of multiplexer circuitry to sequentially couple the induced signals to detection circuitry. A position counter is incremented in response to the oscillator as the conductors in each group are sequentially scanned.

The detection circuitry includes a phase sensitive detector and associated circuitry for generating a characteristic signal that changes polarity in response to a reversal in the phase of the induced signals as the conductors are scanned. As noted above, the phase of the induced signals reverses, and thus the polarity of the characteristic signal changes, as one steps from a conductor on one side of the coil to a conductor on the other side of the coil. This polarity change in the characteristic signal can thus be used to locate the coil relative to the conductors. The detection circuitry generates a stop pulse that is coincident in time with the polarity change in the characteristic signal. The stop pulse is used to disable the position counter which was being incremented during the scanning. Thus, the contents of the position counter when stopped represent the location of the coil with respect to the X group of conductors, and are loaded into an output register. The position counter is then reset, and the conductors of the Y group are scanned in a similar manner to load the output register with a second digital number representing the location of the coil with respect to the Y group of conductors.

U.S. Pat. No. 4,423,286 to Gary A. Bergeron discloses a digitizer system which, like that disclosed in the Rodgers patent, utilizes a coil in a pen to induce signals in an X and Y grid of spaced conductors. In the Bergeron system, however, the conductors of the grid are not scanned sequentially to locate the coil. Instead, addressable multiplexer circuitry in the Bergeron system first couples the center conductor of the X group to detection circuitry which detects the polarity of the signal induced therein. From this polarity and the above-noted principles of electromagnetic theory, a determination is made whether the coil is above or below the center conductor. The multiplexer circuitry then couples to the detection circuitry the center conductor of the half section (upper or lower) in which the coil is located. Again, from the polarity of the signal induced in that conductor, a determination is made as to the particular quarter section in which the coil is located. Additional samplings are taken in the same fashion until it is ascertained that the coil lies between two adjacent X group conductors.

The precise position of the coil between the two adjacent X group conductors is then determined by examining the respective magnitudes of the signals induced in the adjacent conductors. Specifically, a ratio of these signal magnitudes is formed which identifies the precise X location of the coil between the two conductors.

A like set of samplings and measurements is performed on the conductors of the Y group to obtain a precise Y location.

The Bergeron-type system is advantaged in that it typically requires fewer conductor samplings to locate the coil, and enables higher resolution due to its ability to determine position precisely between adjacent conductors. In applications where higher resolutions are not required, the sergeron-type system allows the conductor spacing to be increased, thus reducing the number of conductors required to span a given active area and reducing cost Typically, the active areas of digitizer systems of the above-described types include at least 64 separate conductors in the X group and 64 separate conductors in the Y group. Conventional multiplexers have either 8 or 16 switchable input gates. Thus, at least 4 multiplexers (or 8, depending upon multiplexer type used) are required for coupling the conductors of the X group to the detection circuitry, and an additional 4 (or 8) multiplexers are required for coupling the conductors of the Y group to the detection circuitry. The need for plural multiplexers for each conductor group in the digitizer grid adds considerably to the cost and complexity of design of such systems.

SUMMARY OF THE INVENTION

The present invention provides a digitizer system of improved design as a result of the use of a conductor loopback arrangement which substantially reduces the number of conductors required to span a given active area, and substantially reduces the number of multiplexers required to handle such conductors.

In accordance with the invention, a set of two or more adjacent conductors in each conductor group is looped through a plurality of different sections of a grid active area in such a way that the combination of the wired or unexcited polarities of the adjacent conductors in the set is different in each section.

In the illustrative embodiment disclosed herein, the conductors are looped in pairs through four quarter sections of the grid active area. The result of this conductor pair looping is that the number of separate conductors in each conductor group required to span the active area is reduced by a factor of four. Also, the number of multiplexers required to couple such conductors to induced signal detection circuitry is reduced by a factor of four. Thus, for example, sixteen conductors in each group can be used to span the same active area that formerly required 64 conductors, and one 16-gate multiplexer can be used for each group that formerly required four such multiplexers. This reduction in conductors and components substantially reduces the cost of the digitizer system, while maintaining the high resolution and accuracy of existing systems.

In the preferred embodiment of the invention, this conductor loopback arrangement is used in a digitizer system similar to that disclosed in the above-referenced Bergeron patent, which first coarsely locates the position of an inducing coil between two adjacent conductors, and then precisely locates the position of the coil between the two adjacent conductors by forming a ratio of the respective magnitudes of the signals induced in such conductors. The result is a relatively simple, low cost digitizer system capable of very high resolution position determination.

BRIEF DESCRIPTION OF THE DRAWING

The foregoing and other features and advantages of the invention will be better understood from the following detailed description taken with the accompanying drawing in which.

DETAILED DESCRIPTION OF PREFERRED EMBODIMENT

Figure 1:
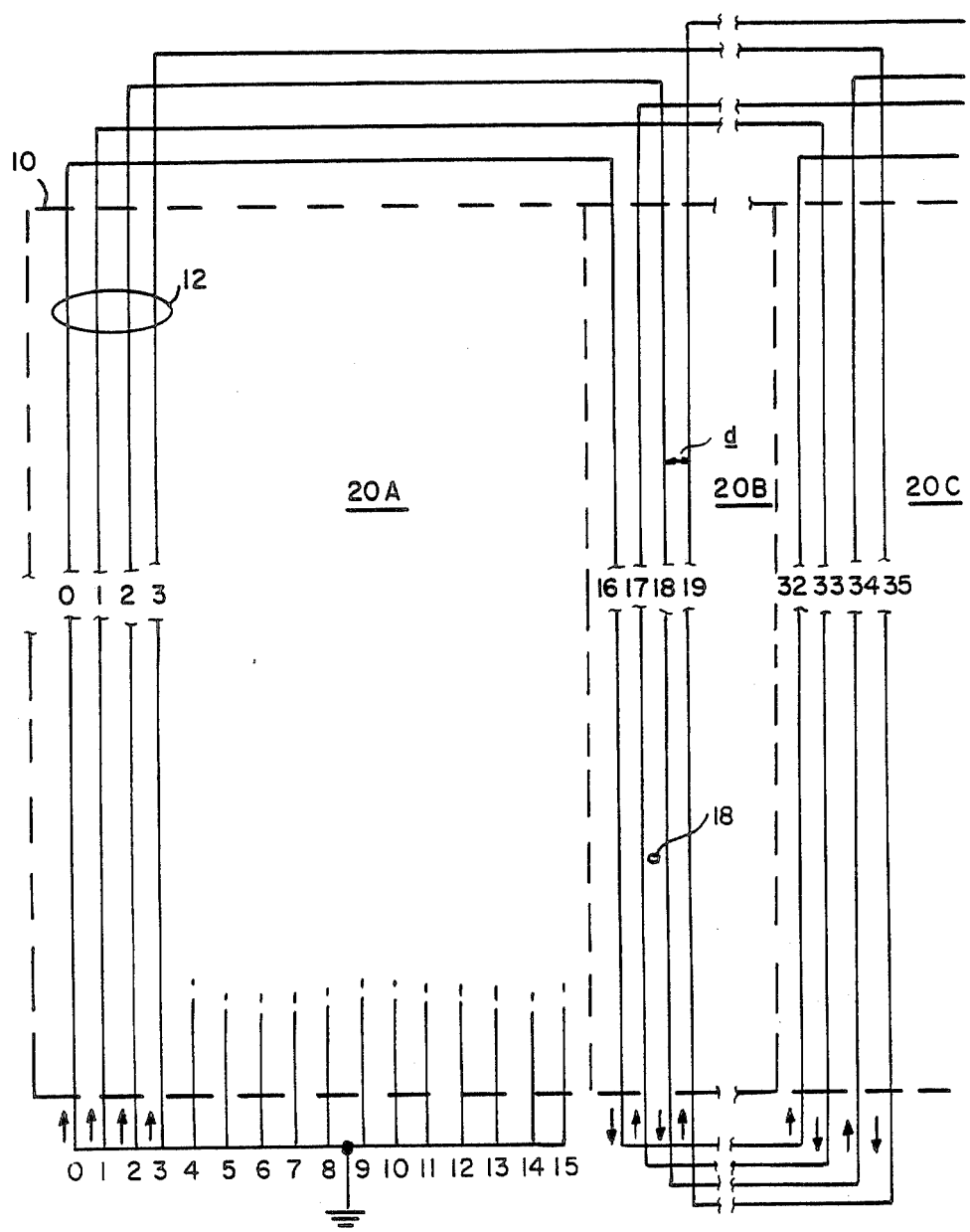
FIG. 1, is an illustration of a digitizer system conductor grid embodied in accordance with the invention, showing conductor pair loopback through four quarter sections of an active area.
Figure 1:
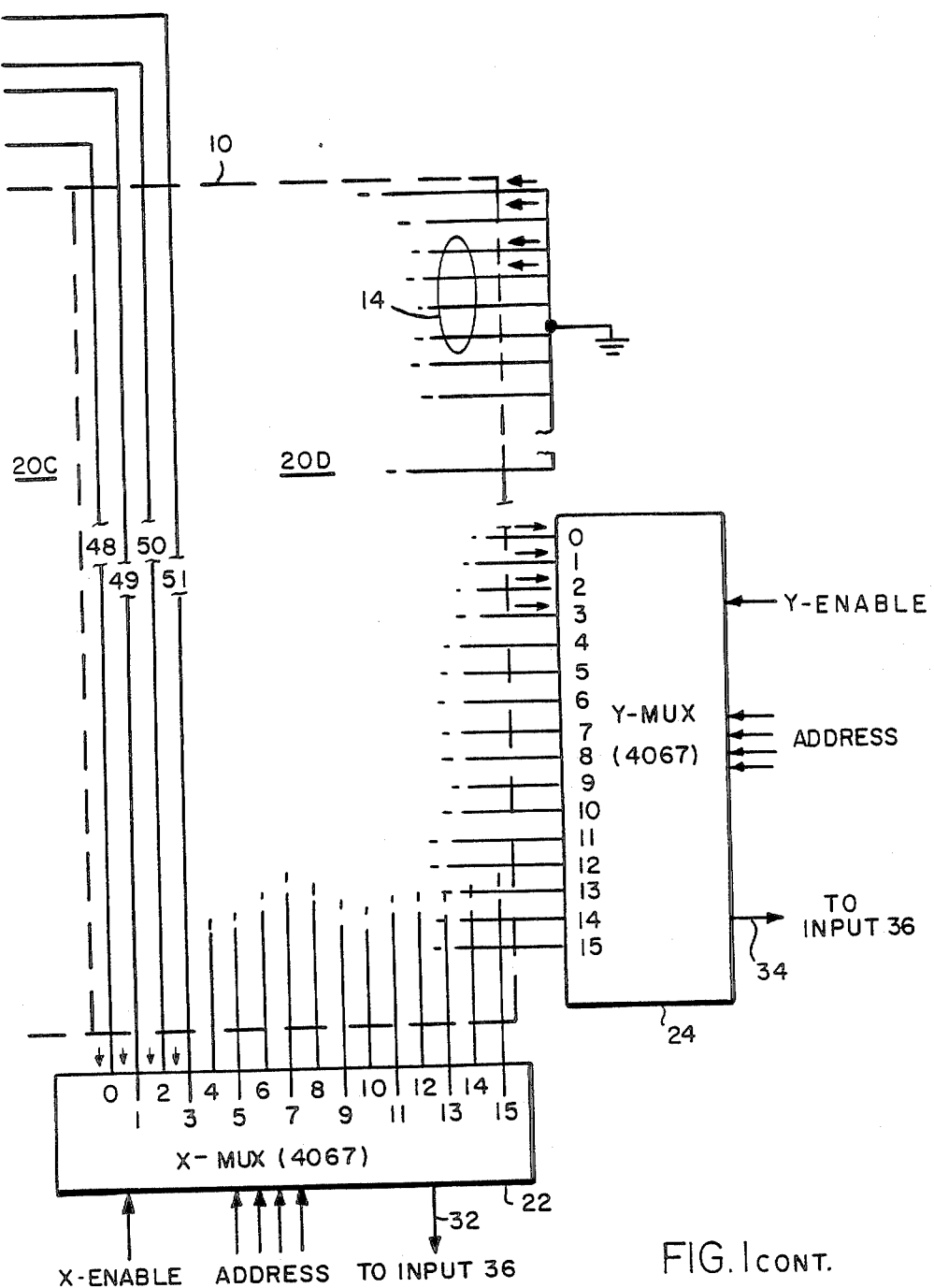

Referring now specifically to the drawing, and initially to FIG. 1 thereof, there is shown a digitizer system conductor grid embodied in accordance with the invention. The grid, which defines a digitizer active area 10, is comprised of a first group 12 having a number n of parallel, spaced conductors oriented in an X direction (vertically in FIG. 1), and a second group 14 having a number m of parallel, spaced conductors oriented in a Y direction (horizontally in FIG. 1). A coil 18, illustratively disposed in the tip of a pen or pointer, is moveable relative to the grid. The function of the digitizer system is to locate the position of the coil 18 on the grid precisely. This is accomplished in the illustrated embodiment by applying an AC signal to the coil 18 and by analyzing the electrical signals inductively coupled to the conductors of the grid by the coil 18.

In the example shown in FIG. 1, n and m are both equal to 16 so that each conductor group 12 and 14 includes 16 conductors 0 through 15. The 16 conductors in the X group 12 are looped through four separate quarter sections 20A, 20B, 20C and 20D of the active area 10. As shown below the quarter section 20A in FIG. 1, one end of each of the 16 conductors in the x group 12 is connected to ground, while the other ends of each of the 16 conductors in the X group 12 are connected to input gates 0 through 15, respectively, of an X-multiplexer 22. Similarily, the 16 conductors in the Y group 14 are looped through four separate quarter sections (not shown) of the active area 10. Also, one end of each of the 16 conductors in the Y group 14 is connected to ground, while the other ends of each of the 16 conductors in the Y group 14 are connected to input gates 0 through 15, respectively, of a Y-multiplexer 24.

Each of the conductors in the X group 12 and Y group 14 has a wired or unexcited polarity defined by the end thereof that is connected to ground. As shown in FIG. 1, each pair of adjacent conductors in the X group 12 is looped through the four quarter sections 20A through 20D of the active area 10 in such a way that the combination of the unexcited polarities of the pair is different in each of the quarter sections. Thus, for example, if we assume a positive unexcited polarity for that segment of a conductor passing through a quarter section which has its lower end, as seen in FIG. 1, grounded, then in section 20A, the segments of conductors 0 and 1 are both positive; in section 20B, the segment of conductor 0 is negative while the segment of conductor 1 is positive; in section 20C, the segment of conductor 0 is positive, while the segment of conductor 1 is negative; and finally, in section 20D, the segments of conductors 0 and 1 are both negative.

Thus, each segment of each conductor in the four quarter sections 20A through 20D of the active area 10 appears as a separate and distinct "wire". In the embodiment shown in FIG. 1, for example, conductor 0 in the X group 12 forms wire 0 in section 20A, wire 16 in section 20B, wire 32 in section 20C, and wire 48 in section 20D. Similarily, conductor 1 in the X group 12 forms wire 1 in section 20A, wire 17 in section 20B, wire 33 in section 20 C, and wire 49 in section 20D. Illustratively, the spacing "d" between each adjacent wire is 0.4 inch and constant across the entire active area 10. With this spacing, the width of each quarter seotion 20A through 20D, that is, the distance between wires in adjacent sections formed from the same conductor, e.g., the distance between wire 0 and wire 16, is about 6 inches (15 spaces times 0.4 inch/space). If the effective range of the inducing coil 18 used to excite the conductors is approximately this same distance e.g., 6 inches, each conductor segment or wire in FIG. 1 can be handled as a separate and distinct wire during induced signal detection and processing simply by adjusting (i.e. changing, where appropriate) the polarities of the detected signals to account for the unexcited polarity differences in each quarter section. This polarity adjustment scheme is described in more detail below in connection with FIGS. 3 and 4.

With the above-described conductor looping arrangement, one can span the same active area width (in this example, 25.2 inches or 63 spaces times 0.4 inch/space) with 16 conductors that formerly required 64 conductors to span. Additionally, instead of requiring four 16-gate multiplexers to switch such conductors to induced signal detection circuitry, with this arrangement, one can accomplish the same purpose with a single multiplexer for each group, such as the multiplexers 22 and 24 shown in FIG. 1 for the X and Y groups 12 and 14, respectively. The result is a substantial reduction in required components and cost.

Figure 2:
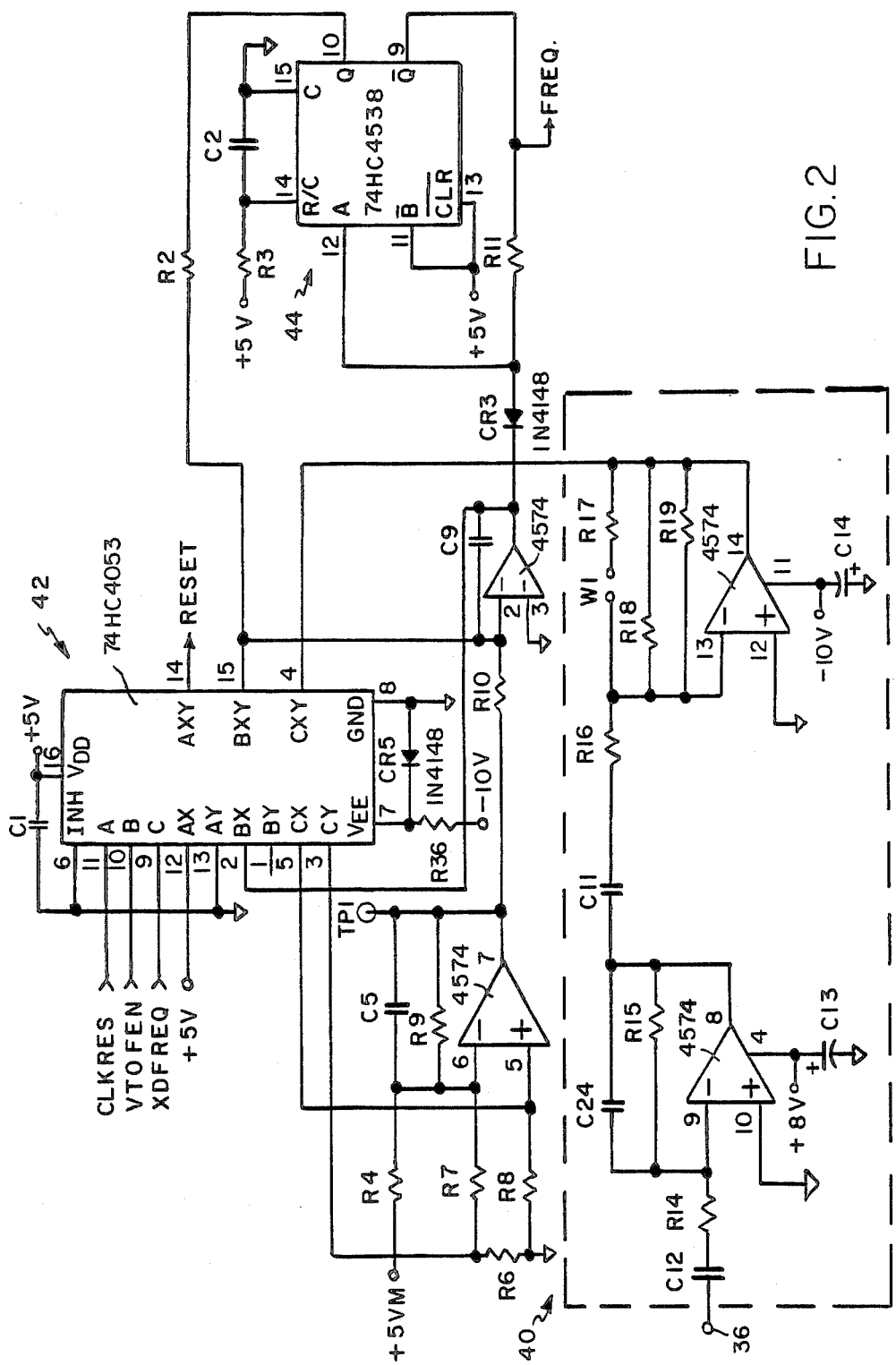
FIG. 2 illustrates circuitry for detecting electrical signals induced in the conductors of the grid of FIG. 1 and for digitizing such signals for further processing.

FIG. 2 illustrates circuitry for detecting the AC electrical signals induced in the conductors of the grid active area 10 by the coil 18. As shown in FIG. 1, the X-multiplexer 22 and the Y-multiplexer 24 have outputs 32 and 34, respectively. These outputs 32 and 34 are connected to input 36 of the detection circuitry of FIG. 2. As noted earlier, the multiplexer 22, when enabled, selects one of its 16 input gates 0 through 15 for coupling to its output 32, and thence to the input 36 of the circuitry of FIG. 2. Similarly, the multiplexer 24, when enabled, selects one of its 16 input gates 0 through 15 for coupling to its output 34, and thence to the input 36 of the circuitry of FIG. 2. Thus, each conductor in the X group 12 and Y group 14 of the grid can be separately coupled to the detection circuitry of FIG. 2 so that the AC signal induced therein by the coil 18 can be analyzed.

The AC signal coupled to input 36 is first passed through an amplifier and filter circuit 40 which provides the proper operating signal levels for the system and filters out noise and other unwanted signal components. The output of the amplifier and filter circuit 40 is applied to a synchronous demodulator 42 which converts the input AC signal to a DC signal. As discussed more fully below, the demodulator 42 is synchronized with the AC signal used to excite or drive the coil 18. The DC signal that is outputted by the synchronous demodulator 42 has a voltage that is proportional to the amplitude of the AC signal that is applied to the input 36, and a polarity that corresponds to that signal's phase.

The output of the synchronous demodulator 42 is applied to an analog-to-digital converter such as the voltage-to-frequency converter 44 shown in the example of FIG. 2. The converter 44 converts the DC voltage output from the demodulator 42 to a variable frequency signal FREQ. The frequency of the signal FREQ deviates from a standard value in proportion to the DC voltage applied to the converter 44, with the magnitude of the deviation being proportional to the voltage, and the direction of the deviation corresponding to its polarity. The signal FREQ is coupled to the circuitry shown in FIG. 3 for further processing.

Figure 3:
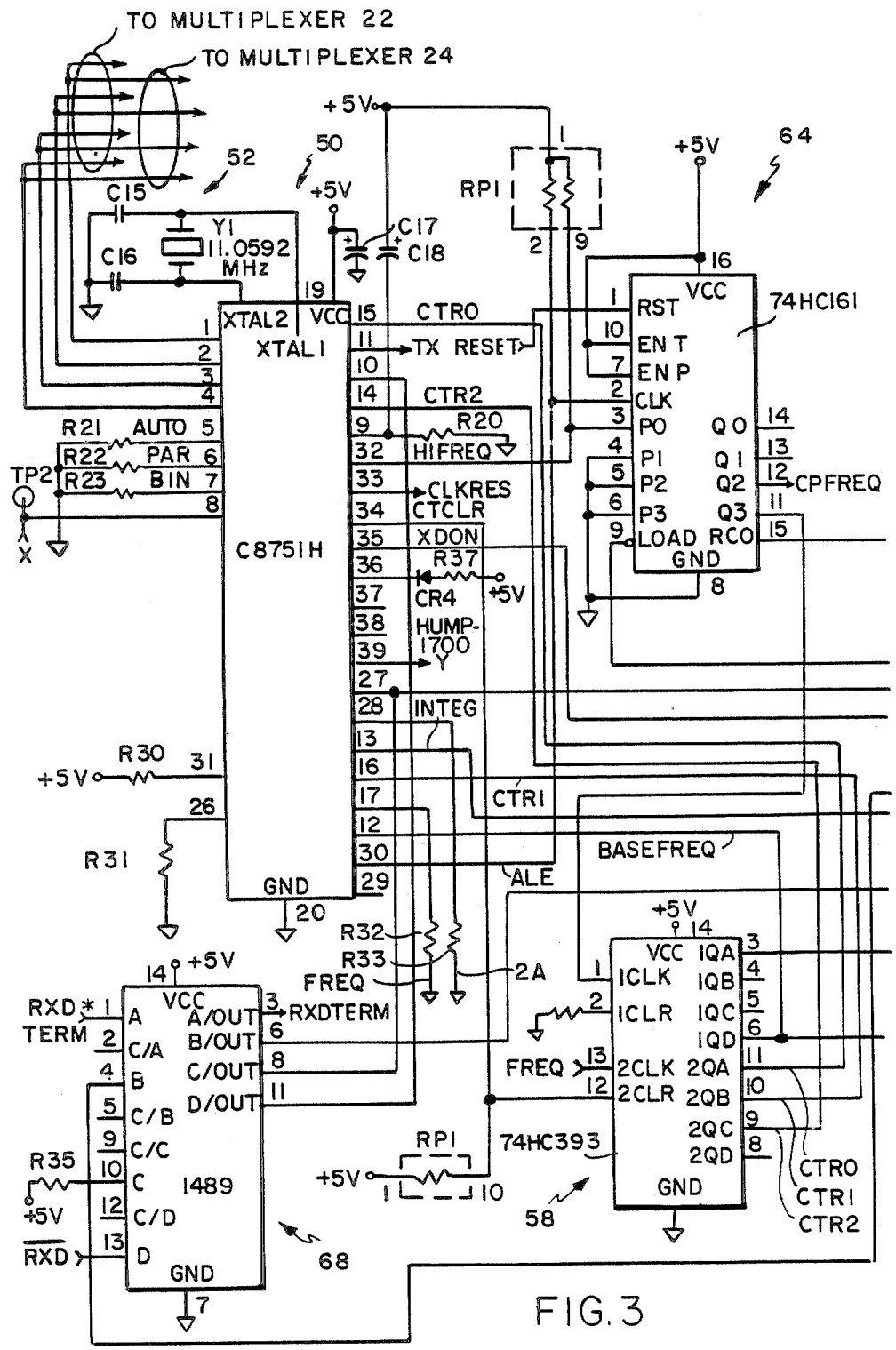
FIG. 3 illustrates circuitry including microprocessor means for processing the digitized signals developed by the circuitry of FIG. 2 and for controlling multiplexer means shown in FIG. 1 during the sampling of the conductors of the digitizer system grid.
Figure 3:
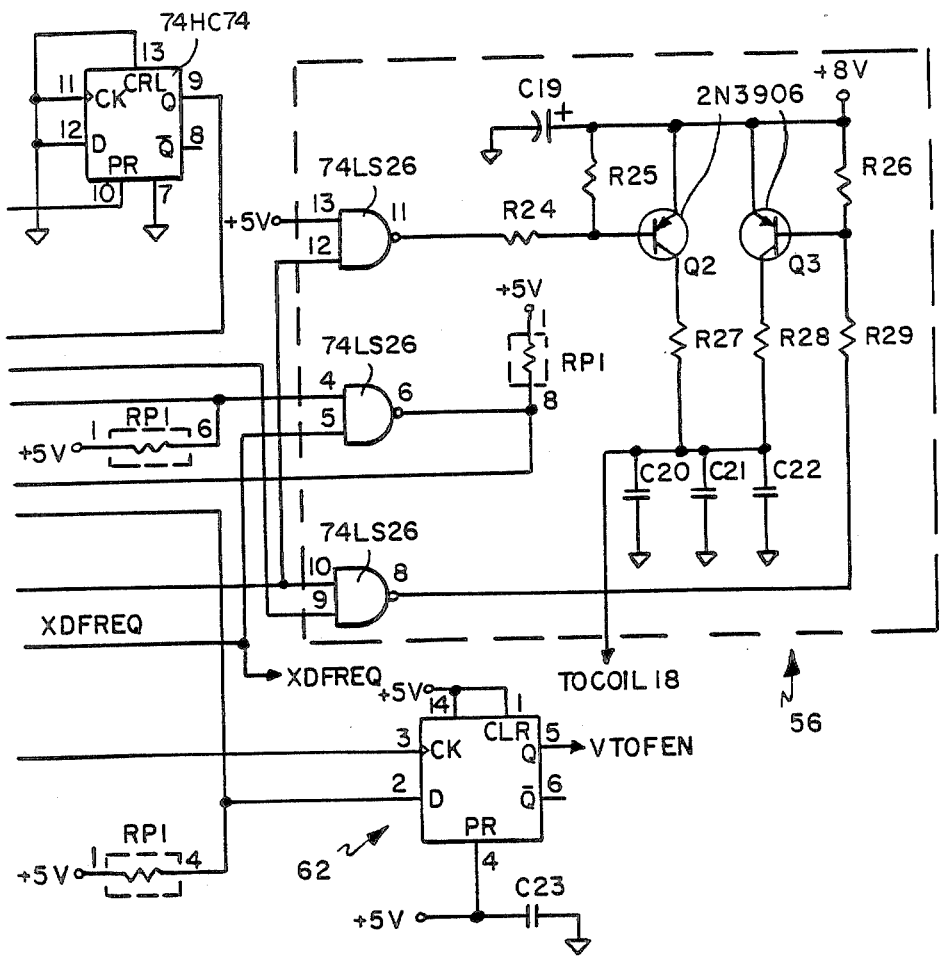

In the circuitry of FIG. 3, a microprocessor 50 is suitably connected to, and programmed to control the sampling of, the conductors of the grid and the processing of the signal FREQ developed by the detection circuitry of FIG. 2 so as to locate the position of the coil 18. The outputs of the microprocessor 50 at pins 1 through 4 are address signals which are coupled to the X-multiplexer 22 and to the Y-multiplexer 24 of FIG. 1. The microprocessor 50 also has outputs at pins 8 and 39 which are respectively coupled to an X-enable input of multiplexer 22 and to a Y-enable input of multiplexer 24. When the microprocessor 50 emits an X-enable signal, it enables multiplexer 22, and disables multiplexer 24. Similarly, when the microprocessor 50 emits a Y-enable signal, it enables multiplexer 24, and disables multiplexer 22. The address signals specify the selected one of the multiplexer input gates 0 through 15, and thus the selected one of the conductors, that is coupled to the input 36 of the detection circuitry of FIG. 2.

An oscillator 52 controls the timing of the microprocessor 52, enabling it to generate various timing signals to control the other components in the circuitry of FIG. 3. For example, the output of the microprocessor 50 at pin 35 is applied to a coil drive circuit 56 which generates the AC signal used to drive the coil 18. The output of the microprocessor 50 at pin 12 is applied to a counter 58 and to a flip-flop 62 which generate signals XDFREQ and VTOFEN. These signals are coupled to the synchronous demodulator 42 of FIG. 2 and used as reference signals to synchronize the operation of the synchronous demodulator 42 with the AC signal used to drive the coil 18.

The signal FREQ from the voltage-to-frequency converter 44 of FIG. 2 is inputted to the counter 58 of FIG. 3. The counter 58 operates in conjunction with counter 64 to generate digital numbers indicative of the polarity and magnitude of the signals detected by the detection circuitry of FIG. 2. The microprocessor 50 utilizes these digital numbers in the sampling of the conductors of the grid to locate the coil 18 relative to the grid. As explained in more detail below, the microprocessor 50 changes the polarities represented by the digital numbers, where appropriate, to account for the different unexcited polarities of the conductors in each of the quarter sections 20A through 20D. Through successive samplings of the digital numbers, the microprocessor 50 coarsely locates the coil 18 between two particular adjacent conductors. In this example, once the coarse location determination is made, the microprocessor 50 generates a ratio of the magnitudes of the signals induced in the two particular conductors adjacent the coil 18. This ratio is used by the microprocessor 50 to interpolate the distance between the two conductors, and thereby to precisely locate the position of the coil 18 there between.

The outputs of the microprocessor 50 at pins 10 and 27 are coupled to a transmitter/receiver circuit 68 to enable communication with auxiliary equipment such as a computer, video display, keyboard on the like.

Other details of the circuitry will be evident to those skilled in the art from the integrated circuit designations, signal labels and connections and other specific information provided by way of illustration in FIGS. 2 and 3.

Figure 4:
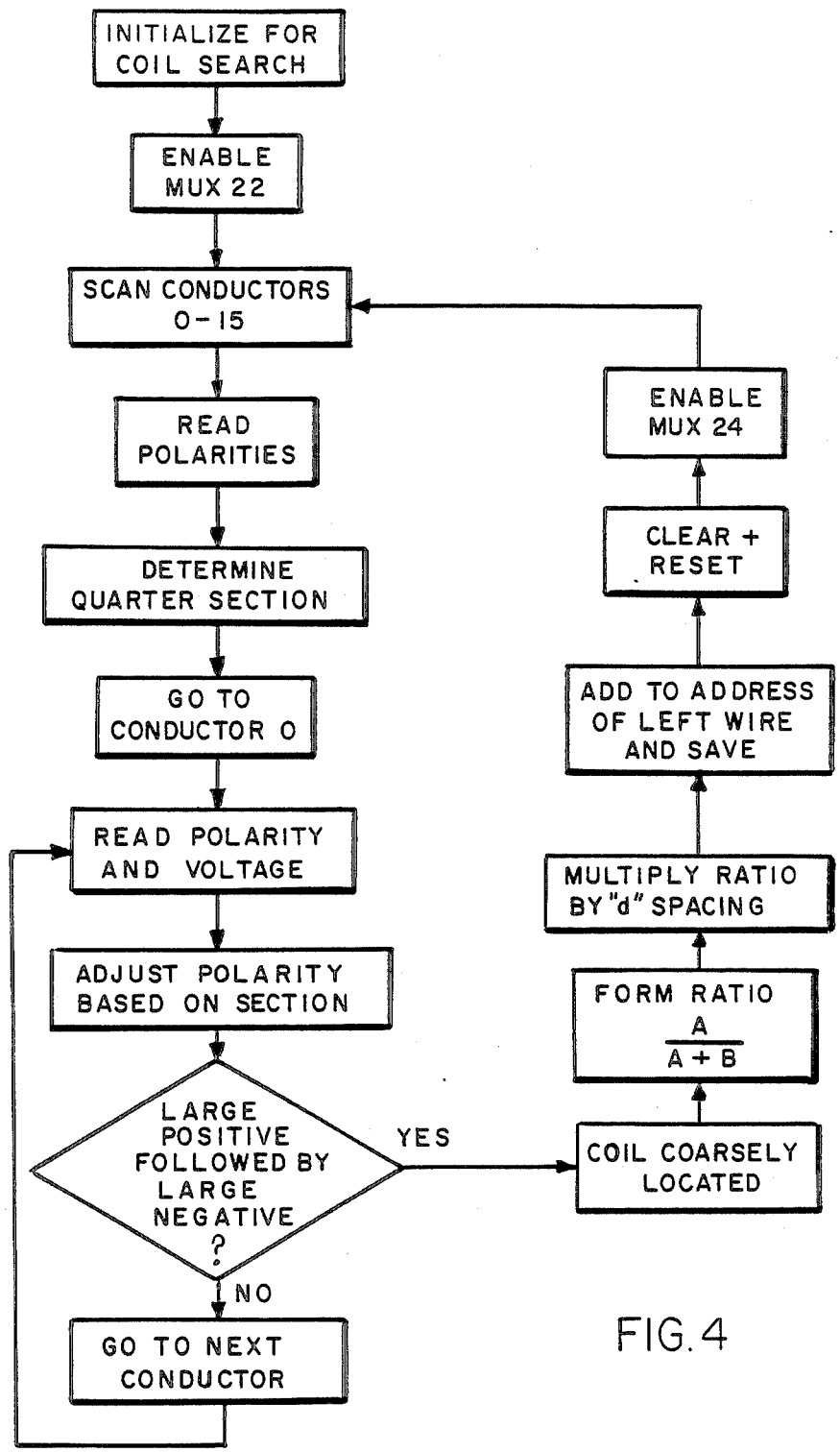
FIG. 4 is a generalized flow chart illustrating the operation of the microprocessor means of FIG. 3.

FIG. 4 is generalized flow chart illustrating the operation of the microprocessor 50. The microprocessor 50, and the circuit components which it controls, are first initialized in preparation for the search for the coil 18. This is followed by the enablement of X-multiplexer 22 and by a scan sequence which involves a sequential scanning of the conductors 0 through 15 of the X group 12 and a reading of the polarities of the signals detected on each. These polarities are used to determine the particular quarter section 20A through 20D in which the coil 18 is located.

The particular quarter section can be determined because of the unique combination of unexcited polarities of each conductor pair in each such section. Specifically, in FIG. 1, the coil 18 is shown to be located between wire 17 and wire 18 which are the segments of conductors 1 and 2 located in quarter section 20B. When conductors 0 through 3 are scanned, the polarities obtained will be −, +, +, −. This combination is obtained because the coil 18 has the effect of maintaining "as is" the unexcited polarities to its left, while reversing the unexcited polarities to its right. This combination uniquely identifies the quarter section that contains the coil 18 as section 20B. If the coil 18 were contained between the segments of conductors 1 and 2 in section 20A, the polarity combination obtained during the scan would be +, +, −, −; in section 20C, the combination would be +, −, −, +; and in section 20D, it would be −, −, +, +. Since these combinations are all unique, the particular quarter section containing the coil 18 can be identified.

After determining the quarter section in which the coil 18 is located, the microprocessor 50 goes back to conductor 0 and reads the polarity and voltage of the induced signal therefrom. The polarity of the signal is then changed, where appropriate, to account for the particular combination of unexcited polarities of the conductor pair in the quarter section determined to contain the coil 18 so that, regardless of the quarter section involved, the microprocessor 50 need only search for a transition from a large positive voltage to a large negative voltage to coarsely locate the coil 18. In this example, the polarity changes that are made under the control of the microprocessor 50 are as follows:

for quarter section 20A, no changes to the polarities are made;

for quarter section 20B, the polarities are reversed for the even numbered wires and kept the same for the odd numbered wires;

for quarter section 20C, the polarities are reversed for the odd numbered wires and kept the same for the even numbered wires;

for quarter section 20D, the polarities are all reversed.

This, since the coil 18 has been determined to be in quarter section 20B, the microprocessor 50 will reverse the polarities of induced signals that it reads from conductors 0, 2, 4, 6, 8, 10, 12, and 14, but will keep the polarities the same for the signals it reads from conductors 1, 3, 5, 7, 9, 11, 13 and 15.

The microprocessor 50 next determines whether it has located a large magnitude positive signal on one conductor followed by a large magnitude negative signal on a conductor adjacent to it. If it has not, it goes to the next conductor and repeats the read and adjust steps. These steps are repeated over and over again until the microprocessor 50 has located the desired transition from large positive to large negative, and has thus coarsely located the coil 18 between the two adjacent wires in quadrant 20B. In the example shown in FIG. 1, the microprocessor 50 will locate the desired large positive-to-large negative transition after scanning and sampling the induced signals on conductors 1 and 2, thus coarsely locating the coil 18 between "wires" 17 and 18 in quarter section 20B.

As noted earlier, the preferred embodiment is adapted to precisely locate the coil 18 between the two adjacent conductors through a ratioing technique. In this respect the microprocessor 50 forms a ratio r according to the following equation:

$$r = A/(A+B)$$

where A is the magnitude or absolute value of the signal on the wire to the left of the coil 18, and B is the magnitude or absolute value of the signal on the wire to the right of the coil 18. Absolute values are used because the polarity of the signal on the left wire is positive while the polarity of the signal on the right wire is negative. The microprocessor 50 multiples that ratio by the spacing "d" between the two wires. The result is added to the addressed location of the left wire to obtain a precise coil position within the X group 12, and this precise X position is saved.

After clearing and resetting the circuit components which were operated to effect the determination of the coil 18 relative to the X group 12, the microprocessor 50 disables the X-multiplexer 22, enables the Y-multiplexer 24 and repeats the above described search routine to obtain a precise coil position within the Y group 14.

It will be appreciated that, with integrated circuit components of the type illustrated in FIGS. 2 and 3, all of the above described operations can be carried out at very high speeds, so that the coil 18 is precisely located relative to the grid active area 10 within fractions of a second. Specific microprocessor program implementations of the generalized flow chart of FIG. 4 will be readily apparent to those skilled in the art.

It should be understood that the above-described embodiment is intended to illustrate rather than limit the invention. Various modifications to the specifically disclosed circuitry and general flow chart will suggest themselves to those skilled in the art.

For example, while the preferred embodiment involved the looping of conductor pairs through four quarter sections of the grid active area, it will be appreciated by those skilled in the art that the basic loopback concept can be extended to involve the looping of three, four or any other number of adjacent conductors in a set through varying numbers of different sections of the grid active area in such a way that the combination of the unexcited polarities of each set is different in each such section. Also, a sequential scanning technique, rather than a ratioing technique, can be used in determining both coarse and fine positions of the coil 18. With such a sequential scanning technique, a characteristic phase-detected signal of the type shown in FIG. 2C of the above-referenced U.S. Pat. No. 4,210,775 to Rodgers et al is generated utilizing circuitry of the type shown in FIG. 3A of that patent. In this respect, an isolation diode matrix of the type shown in FIG. 4 of the Rodgers et al patent may be employed with the loopback conductor grid of this invention, rather than grounding one end of each conductor as shown in FIG. 1 of the drawing herein. Finally, it will be appreciated that, while the preferred embodiment involved driving or exciting the coil 18 to induce signals in the conductors of the grid, that embodiment can be modified to one in which the drive signal is selectively switched by the multiplexers 22 and 24 to respective conductors of the grid to induce signals in the coil 18 which are then detected and processed by the circuitry of FIGS. 2 and 3.

It is accordingly the intent of the appended claims to cover these and other modifications that come within the true and reasonable scope of the invention.

I claim:

1. Apparatus for determining the position of a coil with respect to an active area, comprising:
   (a) a grid of conductors defining said active area, said grid including a first group of n parallel, spaced conductors oriented in an X direction and a second group of m parallel, spaced conductors oriented in a Y direction, each of said conductors having a predetermined unexcited polarity;
   (b) at least two adjacent conductors in each said group being looped through a plurality of different sections of said active area such that the unexcited polarities of said adjacent conductors are different in each of said sections;
   (c) means for exciting either
      i. said coil to induce electrical signals in said conductors, or ii. selected ones of said conductors to induce electrical signals in said coil, said induced signals having a magnitude and polarity depending upon the position of said coil relative to said conductors;
(d) means for detecting the induced signals;
(e) switching means for selectively switching said conductors to either
  i. said detecting means; or
  ii. said exciting means; and
(f) means for selectively changing the polarities of the detected signals in accordance with the different unexcited polarities of said adjacent conductors in said sections.

2. The apparatus of claim 1 wherein said exciting means comprises means for exciting said coil to induce said signals in said conductors, and wherein said switching means comprises means for selectively switching said conductors to said detecting means.

3. The apparatus of claim 2 further including means for sampling the signals induced in said conductors so as to coarsely locate said coil as being between two particular adjacent conductors.

4. The apparatus of claim 3 further including means for generating a ratio of the magnitudes of the signals induced in said two particular adjacent conductors so as to precisely locate said coil between said two particular adjacent conductors.

5. The apparatus of claim 4 wherein said polarity changing means, said sampling means, and said ratio generating means comprise a microprocessor.

6. The apparatus of claim 2 wherein one end of each of said conductors in each said group is connected to ground, and wherein said switching means comprises multiplexer means for selectively switching the other ends of said conductors to said detecting means.

7. The apparatus of claim 1 wherein said sections are of equal width and wherein said exciting means has an effective range approximately equal to the width of said sections.

8. The apparatus of claim 1 wherein each pair of adjacent conductors in each said group is looped through four different quarter sections of said active area such that the combination of the unexcited polarities of said conductors in said pair is different in each of said sections.

9. The apparatus of claim 8 wherein the unexcited polarities of the adjacent conductors in each said pair are positive-positive, negative-positive, positive-negative and negative-negative in a first, second, third and fourth of said quarter sections, respectively, as measured along the X direction and along the Y direction.

10. The apparatus of claim 1 wherein said polarity changing means comprises microprocessor means further including means for controlling said switching means.

11. The apparatus of claim 2 wherein said polarity changing means comprises microprocessor means further including means for controlling said switching means so that said conductors are switched to said detecting means in sequence to coarsely locate said coil as being between two particular adjacent conductors.

12. The apparatus of claim 11 wherein said microprocessor means, after coarsely locating said coil as being between said two particular adjacent conductors, generates a ratio of the magnitudes of the signals induced in said two particular adjacent conductors so as to precisely locate said coil between said two particular adjacent conductors.

13. A method for determining the position of a coil with respect to an active area defined by a grid of conductors, the grid including a first group of n parallel, spaced conductors oriented in an X direction, and a second group of m parallel spaced conductors oriented in a Y direction, each of the conductors having a predetermined unexcited polarity, said method comprising the steps of:
(a) looping at least two adjacent conductors in each said group through a plurality of different sections of the active area such that the unexcited polarities of the adjacent conductors are different in each of the sections;
(b) exciting either
  i. the coil to induce electrical signals in the conductors, or
  ii. selected ones of the conductors to induce electrical signals in the coil, the induced signals having a magnitude and polarity depending upon the position of the coil relative to the conductors;
(c) selectively switching the conductors to either
  i. means for detecting the induced signals; or
  ii. means for exciting the conductors; and
(d) selectively changing the polarities of the detected signals in accordance with the different unexcited polarities of the adjacent conductors in the sections.

14. The method of claim 13 wherein said exciting step comprises the step of exciting the coil to induce the signals in the conductors, and wherein said switching step comprises the step of selectively switching the conductors to the induced signal detecting means.

15. The method of claim 14 further including the step of sampling the signals induced in the conductors so as to coarsely locate the coil as being between two particular adjacent conductors.

16. The method of claim 15 further including the step of generating a ratio of the magnitudes of the signals induced in the two particular adjacent conductors so as to precisely locate the coil between the two particular adjacent conductors.

17. The method of claim 14 wherein one end of each of the conductors in each group is connected to ground, and wherein said switching step comprises the step of selectively switching the other ends of the conductors to the induced signal detecting means.

18. The method of claim 13 wherein said looping step comprises the step of looping each pair of adjacent conductors in each group through four different quarter sections of the active area such that the combination of the unexcited polarities of the conductors in the pair is different in each of the sections.

19. The method of claim 18 wherein the unexcited polarities of the adjacent conductors in each pair are positive-positive, negative-positive, positive-negative, and negative-negative in a first, second, third and fourth of the quarter sections, respectively, as measured along the X direction and along the Y direction.

20. The method of claim 14 wherein said switching step comprises the step of switching the conductors to the induced signal detecting means in sequence to coarsely locate the coil as being between two particular adjacent conductors.

21. The method of claim 20 further including the step of generating a ratio of the magnitudes of the signals induced in the two particular adjacent conductors to precisely locate the coil between the two particular adjacent conductors.

22. Apparatus for determining the position of a coil with respect to an active area, comprising:
   (a) a grid of conductors defining said active area, said grid including a first group of parallel, spaced conductors oriented in an X direction and a second group of parallel, spaced conductors oriented in a Y direction, one end of each of said conductors in each of said groups being connected to ground, each of said conductors having a predetermined unexcited polarity defined by said grounded end;
   (b) each pair of adjacent conductors in each said group being looped through four different quarter sections of said active area such that the unexcited polarities of each said conductor pair are different in each one of said quarter sections;
   (c) a coil moveable relative to said grid;
   (d) means for exciting either
      i. said coil to induce electrical signals in said conductors, or
      ii. selected ones of said conductors to induce electrical signals in said coil, the induced signals having a magnitude and polarity depending upon the position of said coil in respect to said conductors;
   (e) means for detecting the magnitude and polarity of the induced signals;
   (f) multiplexer means for selectively switching the other ends of said conductors to either
      i. said detecting means; or
      ii. said exciting means; and
   (g) microprocessor means for controlling said detecting means and said multiplexer means and further including
      (1) means for selectively changing the polarities of said detected induced signals to account for the different unexcited polarities of said conductor pairs in each one of said quarter sections,
      (2) means for causing said multiplexer means to sample the polarities of said detected induced signals to coarsely locate said coil as being between two particular adjacent conductors, and
      (3) means for generating a ratio of the magnitudes of said detected induced signals for said two particular adjacent conductors to precisely locate said coil between said two particular adjacent conductors.

23. The apparatus of claim 22 wherein said exciting means comprises means for exciting said coil to induce said signals in said conductors and wherein said multiplexer means comprises means for selectively switching the other ends of said conductors to said detecting means.

24. The apparatus of claim 23 wherein said multiplexer means is addressable to select the one of said conductors that is switched to said detecting means, and wherein said microprocessor means controls said multiplexer means by transmitting address signals to said multiplexer means.

25. The apparatus of claim 22 wherein said microprocessor means further includes means responsive to the polarity of the signals detected by said detecting means for identifying the one of said quarter sections in which said coil is located, and wherein said polarity changing means changes the polarities of the signals detected by said detecting means in accordance with the unexcited polarities of said conductor pairs in said identified quarter section.

26. The apparatus of claim 22 wherein each of said quarter sections is of equal width and wherein said exciting means has an effective range approximately equal to said width.

27. The apparatus of claim 22 wherein adjacent conductors in each of said quarter sections are equally spaced from one another by about 0.4 inch.

* * * * *

UNITED STATES PATENT AND TRADEMARK OFFICE
CERTIFICATE OF CORRECTION

PATENT NO. : 4,734,546
DATED : March 29, 1988
INVENTOR(S) : Waldo L. Landmeier

It is certified that error appears in the above-identified patent and that said Letters Patent is hereby corrected as shown below:

Column 1, line 36, rewrite "(80°" as --(180° --.

Column 2, line 36, "sergeron" should be --Bergeron--.

Column 4, line 45, "seotion" should be --section--.

Column 6, line 36, "on" should be --or--.

Column 7, line 28, "This" sould be --Thus--.

Column 9, line 12, (Claim 1) "aocordance" should be --accordance--.

Signed and Sealed this

Thirty-first Day of July, 1990

Attest:

HARRY F. MANBECK, JR.

*Attesting Officer*　　　*Commissioner of Patents and Trademarks*